United States Patent
van Doorn et al.

(10) Patent No.: US 9,749,278 B1
(45) Date of Patent: Aug. 29, 2017

(54) PERSISTENT CONNECTIONS FOR EMAIL WEB APPLICATIONS

(71) Applicant: Amazon Technologies, Inc., Seattle, WA (US)

(72) Inventors: Ivo van Doorn, The Hague (NL); Daniel Christianto, Seattle, WA (US); Simon Arthur Koster, Rotterdam (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/831,689

(22) Filed: Aug. 20, 2015

Related U.S. Application Data

(63) Continuation of application No. 14/033,995, filed on Sep. 23, 2013, now Pat. No. 9,118,650.

(51) Int. Cl.
| | |
|---|---|
| *H04L 12/58* | (2006.01) |
| *H04L 29/06* | (2006.01) |
| *H04L 29/08* | (2006.01) |
| *G06F 17/30* | (2006.01) |

(52) U.S. Cl.
CPC ........ *H04L 51/22* (2013.01); *G06F 17/30864* (2013.01); *H04L 63/08* (2013.01); *H04L 67/141* (2013.01)

(58) Field of Classification Search
CPC ....... H04L 51/22; H04L 63/08; H04L 67/141; G06F 17/30864
See application file for complete search history.

(56) References Cited

U.S. PATENT DOCUMENTS

| | | | |
|---|---|---|---|
| 8,700,021 B2* | 4/2014 | Miller | H04M 1/72522 455/419 |
| 8,959,650 B1* | 2/2015 | Richards | G06F 21/44 709/227 |
| 9,118,650 B1* | 8/2015 | van Doorn | H04L 63/08 |
| 2005/0198379 A1 | 9/2005 | Panasyuk et al. | |
| 2006/0143136 A1* | 6/2006 | Low | H04L 63/08 705/64 |
| 2007/0171921 A1 | 7/2007 | Wookey et al. | |
| 2009/0193508 A1 | 7/2009 | Brenneman et al. | |
| 2010/0306535 A1* | 12/2010 | Jain | G06F 21/606 713/168 |
| 2011/0283110 A1 | 11/2011 | Dapkus et al. | |
| 2011/0283347 A1* | 11/2011 | Bhuta | H04L 63/0807 726/9 |
| 2013/0007869 A1 | 1/2013 | Thomas | |
| 2014/0324979 A1 | 10/2014 | Gao et al. | |

(Continued)

OTHER PUBLICATIONS

Mislove et al., "Experiences in Building and Operating ePOST, a Reliable Peer-to-Peer Application", Apr. 2006, ACM, pp. 147-159.*

*Primary Examiner* — Matthew Smithers
(74) *Attorney, Agent, or Firm* — Baker & Hostetler

(57) ABSTRACT

A token for a webclient in communication with an HTTP server to access an email system is stored at a database by the HTTP server. If the HTTP server is unexpectedly unavailable, a backup HTTP server that next interacts with the webclient can locate the token for the webclient using identifying information for the webclient to locate a record in the database containing the token. The backup HTTP server can then provide seamless access to the email system for the webclient despite the loss of connectivity to the initial HTTP server.

20 Claims, 7 Drawing Sheets

(56) References Cited

U.S. PATENT DOCUMENTS

2015/0052177 A1* 2/2015 Roseman .......... G06F 17/30115
707/822
2015/0229636 A1* 8/2015 Scavo .................... H04L 29/06
726/8

* cited by examiner

PERSISTENT CONNECTIONS FOR EMAIL WEB APPLICATIONS

CROSS-REFERENCE TO RELATED APPLICATIONS

This application is a continuation of U.S. patent application Ser. No. 14/033,995 filed Sep. 23, 2013, the contents of which are incorporated by reference in their entirety.

BACKGROUND

Many services offered to users via the Internet, such as email services, provide a web interface ("webclient") that allows users to interact with a server using a web browser. User connectivity to such servers is facilitated by one or more web servers (typically Hypertext Transfer Protocol (HTTP) servers) that retrieve data in response to user web page requests and host web applications. Mail servers and web servers are typically located in a data center or some other facility remote from the user. Redundancy is usually built into such systems, with redundant servers providing service in the event of a failure of a primary server and redundant communications links connected to the Internet to provide service in the event of a failure of one or more communications links.

When a user attempts to access an email system using a webclient, the webclient connects to a web email application hosted by an HTTP server and sets up a communications session with the HTTP server. Upon initiating such a session, some form of authentication is normally required by the HTTP server. This may take the form of a username and password combination, access key, token, or some other form of user identity verification. Upon authenticating the user, the HTTP server may provide access to the user's email account and information on the mail server via the web email application hosted by the HTTP server. If there is a failure of the HTTP server hosting the web email application being used by the webclient, or if the connection between the HTTP server and the webclient fails, the webclient is likely to be directed to a backup HTTP server hosting another web email application. When this happens, the user may have to provide authentication information again because the user's authentication information has not been received by, or stored at, the backup HTTP server.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Email systems, and many social websites and other interactive websites, require user accounts for access and full utilization of the provided features. This is to ensure that each user's private information remains private and to ensure that only authorized users are permitted to take advantage of the services and features provided by the website or email system. Systems and methods in accordance with the various embodiments of the present disclosure provide the ability to automatically save and reuse authentication information for a user if a connection to a server (e.g., an HTTP server) is lost during a communication session between the server and a webclient being operated by the user to interact with the website or email system. For example, a user may be interacting with an email system using a webclient after authenticating the user's identity with the HTTP server hosting a web application that provides access to the email system. If the HTTP server facilitating the user's access to the email system fails or otherwise becomes inaccessible, the user's authentication information may be lost because such information may be stored only locally on the HTTP server. The user's webclient may then be redirected to a backup or alternate HTTP server upon its next attempt to interact with the email system, and the user may have to provide authentication information to the backup HTTP server in order to continue interaction with the email system. In an embodiment, the HTTP server with which the webclient was initially communicating may store the user's authentication information in a database that is accessible to one or more back up HTTP servers. Upon failure of a connection to an initial HTTP server, a backup HTTP server may, upon receiving a request from a webclient for email system access, retrieve the stored authentication information from the database using identifying information associated with the webclient and/or the user. In this way, the user maintains access to the email system without having to provide authentication information again, presenting a seamless interface to the user despite the failure of the initial HTTP server or a connection thereto. While many of the examples discussed herein are discussed in terms of email and mail servers and systems, one skilled in the art will appreciate that the disclosed embodiments can be readily applied to any system where a lack of connectivity may occur during a communications session with a system that requires user authentication. All such applications are contemplated as embodiments that are within the scope of the present disclosure.

Figure 1:
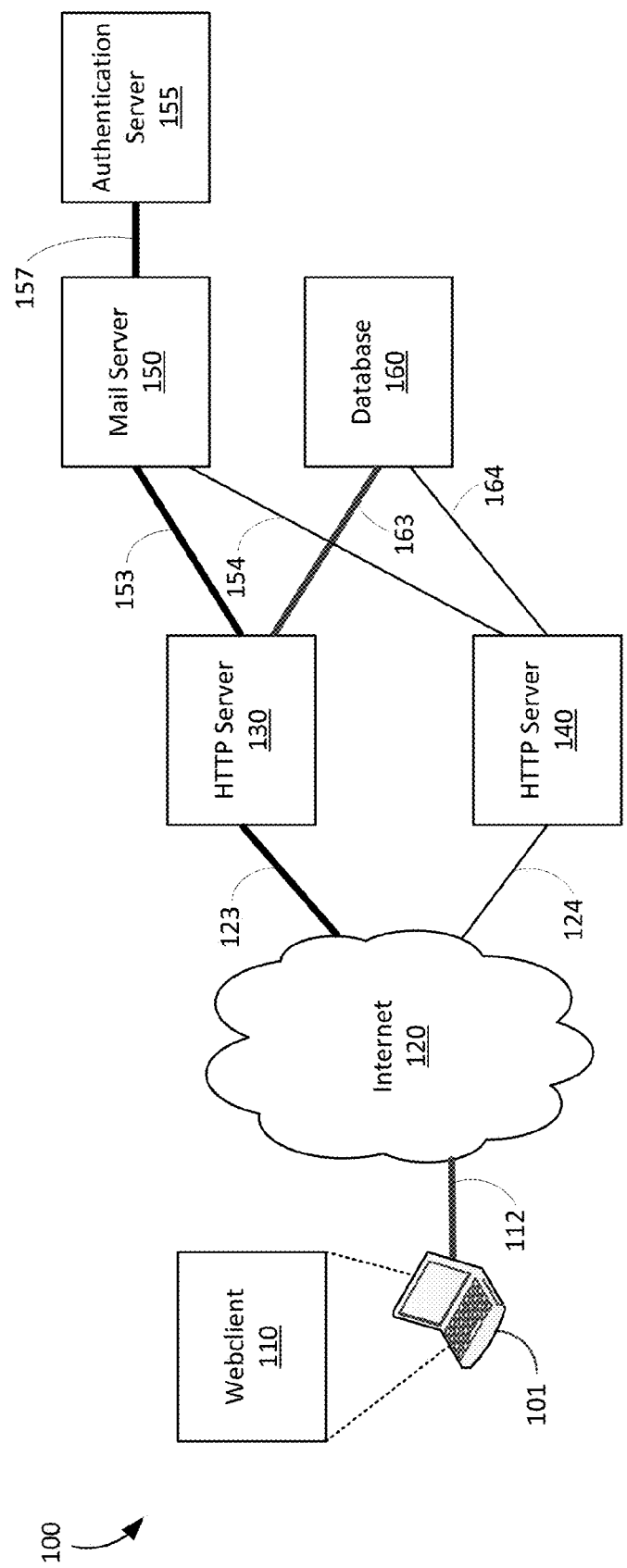
FIG. 1 illustrates an example environment in which embodiments of the invention may be implemented.

FIG. 1 illustrates non-limiting exemplary system 100 in which embodiments of the instant disclosure may be implemented. A user may be operating user device 101 that may be any type of computer, computing device, mobile device, smartphone, or any other device capable of operating a webclient. Webclient 110 may be executing on user device 101 in, for example, a web browser. Webclient 110 may be an email webclient providing an interface to an email system hosted or otherwise provided by an email service provider. User device 101 may communicate with other devices generally, and specifically with one or more email service provider devices, using Internet 120 via communications link 112. Communications link 112 may be any type and number of communications links capable of facilitating communication between two or more devices, including a wired communications link, a wireless communications link, and a combination thereof, using any protocol or other means of enabling communication between devices. Internet 120 represents any type and number of networks, and any combination thereof, that facilitate communication between devices. All such embodiments are contemplated as within the scope of the present disclosure.

Webclient 110 may be communicating with HTTP server 130 that connects to Internet 120 using communications link 123 that, like communications link 112, may be any type and number of communications links. HTTP server 130 may host and provide access to mail server 150 using a web application executing on HTTP server 130. Through such a web application, HTTP server 130 may receive email data from and transmit email data to webclient 110. HTTP server 130 may also, in an embodiment using a web application executing on HTTP server 130, exchange email data with mail server 150 via communications link 153 that may also be any type and number of communications links.

Mail server 150 and/or HTTP server 130 may require authentication for users attempting to interact with mail server 150. When a user operating webclient 110 initially attempts to access mail server 150 via HTTP server 130 (and, in some embodiments, via a web application executing on HTTP server 130), HTTP server 130 may request authentication information from webclient 110. Such authentication information may take any form, including a username and password combination, an access key, a token, or some other form of user or device identity verification. Upon receiving authentication information from webclient 110, HTTP server may transmit such authentication information to mail server 150 for verification. Note that the authentication information sent by HTTP server 130 may include any other information that may be used to verify the identity of webclient 110, device 101, and/or a user thereof. This additional information may be included in the authentication information provided by webclient 110, or it may be added by HTTP server 130 to the authentication information provided by webclient 110. Mail server 150 may transmit the authentication information received from HTTP server 130 to authentication server 155 via communications link 157 that may be any type and number of communications links. This transmission may include a request to verify the identity of webclient 110, device 101, or a user thereof.

Upon receipt of the authentication information from mail server 150, authentication server 155 may authenticate or otherwise verify the information. If authentication server 155 determines that the authentication information does not authenticate or is otherwise not verifiable, it may send an indication to mail server 150 indicating a failure to authenticate the authentication information. Mail server 150 may then send an indication or message reflecting the failure of authentication to HTTP server 130, which may relay the authentication failure information to webclient 110.

Upon successful authentication of the identity of webclient 110, device 101, or a user thereof based on the authentication information provided to it, authentication server may generate a token that is associated with webclient 110, device 101, or a user thereof, and may transmit the token to mail server 150, which may provide the token to HTTP server 130. Upon receipt of the token, HTTP server 130 may begin to provide email system access to webclient 110. HTTP server 130 may store the token locally (e.g., local memory, hard disk). In an embodiment, HTTP server 130 may also, or instead, store the token (or a copy thereof) in database 160 via communications link 163. Communications link 163 may be any type and number of communications links. Database 160 represents any type and number of databases and database systems, including a cloud-based database system, as well as any number and type of memory, cache, disk drive, etc. Database 160 also represents any form of storage that may be used to store any amount and type of data. In an embodiment, HTTP server may generate, upon authentication of webclient 110, a session identifier that may be stored at HTTP server 130 and that may be transmitted to webclient 110 for local storage at device 101, for example in a "cookie". Any storage of the token may be performed securely, using encrypted files, communications, communications links, etc., regardless of whether the token is stored locally or remotely.

The record containing the token may be identified or otherwise associated with webclient 110, device 101, or a user thereof. For example, a webclient identifier (e.g., session identifier) may be used to identify the record associated with the token in database 160. Any other means of associating a record for a token with webclient 110, device 101, or a user thereof may be used, and all such embodiments are contemplated as within the scope of the present disclosure.

HTTP server 140 may provide redundancy to users by serving as a backup HTTP server for HTTP server 130. HTTP server 140 may connect to other devices using communications link 124, and may communicate with database 160 and mail server 150 using communications links 164 and 154, respectively. Each of communications links 124, 154, and 164 may be any type and number of communications links. Note that each of communications links 124, 154, and 164 is shown with less emphasis in FIG. 1 only to make clear that in FIG. 1 webclient 110 and other devices are communicating using other links rather than communications links 124, 154, and 164. The various widths and emphases of the communications links shown in the instant figures should not be understood to be an indication of any other characteristic, feature, or limitation of the illustrated communications links.

Figure 2:
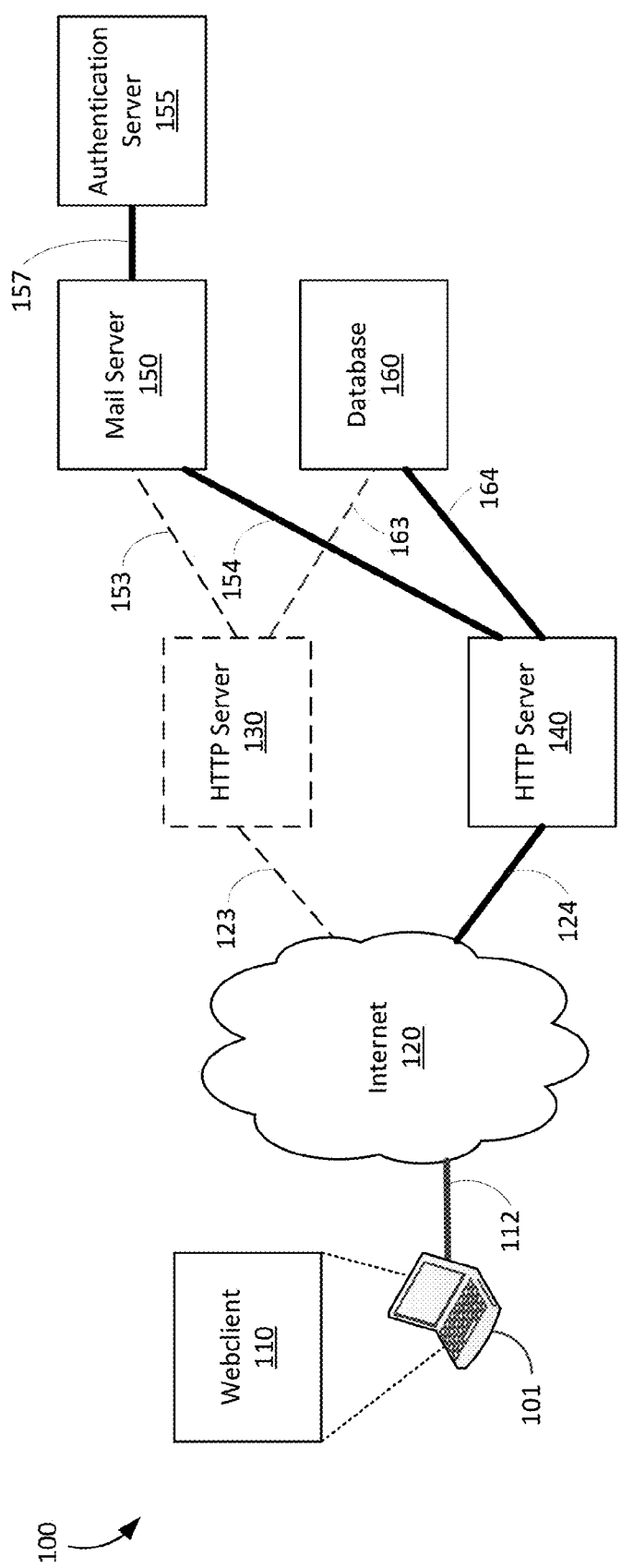
FIG. 2 illustrates another example environment in which embodiments of the invention may be implemented.

FIG. 2 illustrates non-limiting exemplary system 100 where HTTP server 130 is no longer in communication with webclient 110. This may be due to a failure of communications link 123, a failure of HTTP server 130, a failure of webclient 110, the browser executing webclient 110, device 101, or any other reason. Where the loss of communication between webclient 110 and HTTP server 130 is due to a failure of webclient 110, the browser executing webclient 110, or device 101, webclient 110 may, upon regaining functionality, use a stored session identifier or other stored data (e.g., stored in a "cookie") to attempt to resume a communications session with an HTTP server. Here, the server with which webclient 110 communicates after return to functionality may not be the same HTTP server initially used (i.e., HTTP server 130) due to network configurations rather than due to a failure HTTP server 130.

In an alternative embodiment, HTTP server 130 may become unavailable due to failure to successfully communicate over one or more of communications links 153 and 163. In such embodiments, HTTP server 130, or another system or device, may determine that communication over one or more of these links is not functional and cause HTTP traffic for webclient 110 to be diverted to HTTP server 140, even though HTTP server 130 itself may otherwise be functional. Once HTTP server 130 is no longer available to service webclient 110, traffic from webclient 110 may be redirected to HTTP server 140. This may happen automatically using any means and methods and may be transparent to webclient 110 and/or the user thereof.

Like HTTP server 130, HTTP server 140 may be executing a web application that facilitates communication between webclients and mail server 150. Upon receiving a request for interaction with mail server 150 from webclient 110, HTTP server 140 may determine whether a valid token associated with webclient 110, device 101, or a user thereof is present at database 160. HTTP server may use information available from the request for mail system access received from webclient 110 to identify any records in database 160 associated with webclient 110, device 101, or a user thereof. For example, the request may include a webclient identifier (e.g., session identifier) that may be used to identify a record associated with webclient 110, device 101, or a user thereof in database 160. Any other means of locating a record associating a token with webclient 110, device 101, or a user thereof are contemplated. If no token is present, or if the token present on database 160 is not valid (e.g., expired), HTTP server 140 may initiate a normal authentication process with webclient 110.

If a token is present at database 160, database 160 may provide HTTP server 140 with a copy of the token in its reply to HTTP server 140's query. HTTP server 140 may send the token to mail server 150 and/or authentication server 155 with a request to determine whether the token is valid. A response may be received from one or both of these servers at HTTP server 140 indicating the validity of the token. If the token is not valid, HTTP server 140 may begin standard authentication procedures to authenticate webclient 110. HTTP server 140 may also remove the invalid token from the database. If the token is valid, HTTP server 140 may begin interacting with webclient 110 and mail server 150 to provide email system access to webclient 110 as if webclient 110 had initially authenticated via HTTP server 140, thus providing a seamless transition from HTTP server 130 to HTTP server 140 to a user of webclient 110.

Note that while the devices of FIGS. 1 and 2 are described separately and individually, these devices may be physically combined or may be several devices physically distributed across one or more datacenters or other geographical locations. For example, mail server 150 and authentication server 155 may be a single device or the functions associated with mail server 150 and authentication server 155 may be performed by one or more devices. Note also that the connections between devices may be secured using authentication and/or any other means to ensure that data exchanges between devices are less likely to be intercepted or, if intercepted, less likely to be decipherable to any non-intended recipients. All such embodiments are contemplated as within the scope of the present disclosure.

Figure 3:
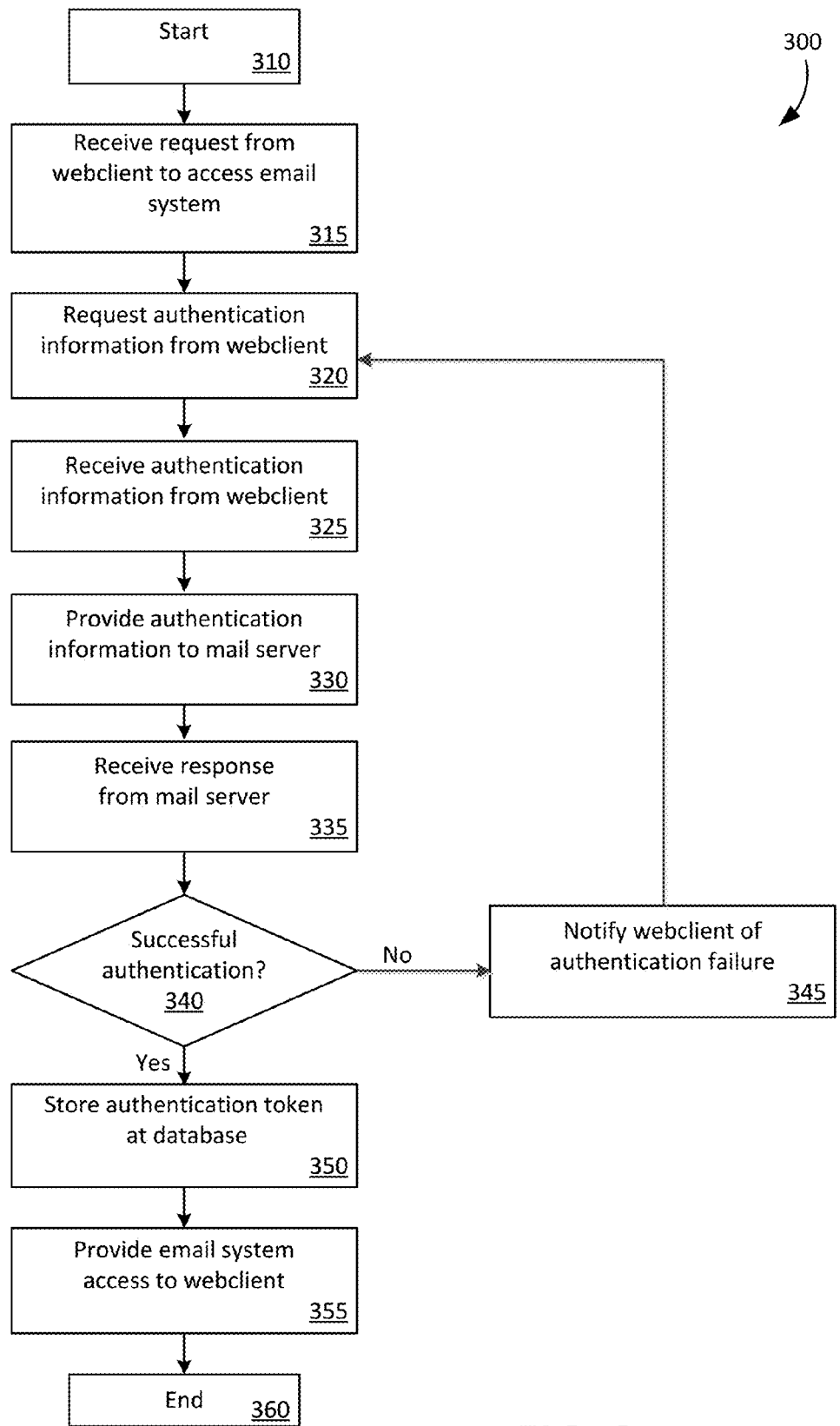
FIG. 3 depicts example operating procedures for an HTTP server, according to embodiments.

FIG. 3 depicts example operating procedures 300 for an HTTP server, according to embodiments. Operating procedures 300 begin with operation 310 and move to operation 315 where an HTTP server may receive an indication of a webclient requesting service via the HTTP server for access to an email system. This may take any form, including a request for access to a webpage that provides an email system interface. At operation 320, the HTTP server may request authentication information from the webclient. Such a request may take any form, as may the requested authentication information. For example, the request for authentication information may be a request for a username and password combination, an access key, a token, or any other form of user or device authentication information. At operation 325, the requested authentication information may be received from the webclient.

At operation 330, the received authentication information may be provided to the mail server. The mail server may use this information to interact with an authentication server to determine if the authentication information can be verified. At operation 335, a response may be received from the mail server indicating whether the authentication was successful. If the response received from the mail server indicates that authentication was not successful, at operation 345 the HTTP server may notify the webclient of the authentication failure. In some embodiments, the HTTP server may again request authentication information, returning to operation 320.

Where the authentication is successful, the response received at operation 335 may include a token or other data that may be used to indicate to an HTTP server that a device has been authenticated. Such token or data may be stored locally by the HTTP server. At operation 350, the HTTP server may store the token or other such data at a database, associating the record containing the token or other data with, for example, a webclient identifier or communications session identifier (e.g., a session identifier for the webclient and/or the particular communications session in which the webclient and the HTTP server are engaged) that may be used to identify a record associated with the webclient, a device executing the webclient, or a user of the webclient. Note that a session identifier or other identifying information may have been provided to the webclient by the HTTP server and the webclient may store such information on the user device executing the webclient, in some embodiments as a "cookie" or data stored by a web browser executing on the user device. Alternatively, any other means of identifying a record as associated with the webclient, a device executing the webclient, or a user of the webclient are contemplated. Any storage of the token may be performed securely, using encrypted files, communications, communications links, etc., regardless of whether the token is stored locally or remotely. At operation 355, the HTTP server may provide email system access to the webclient, with operating procedures 300 ending at operation 360.

Figure 4:
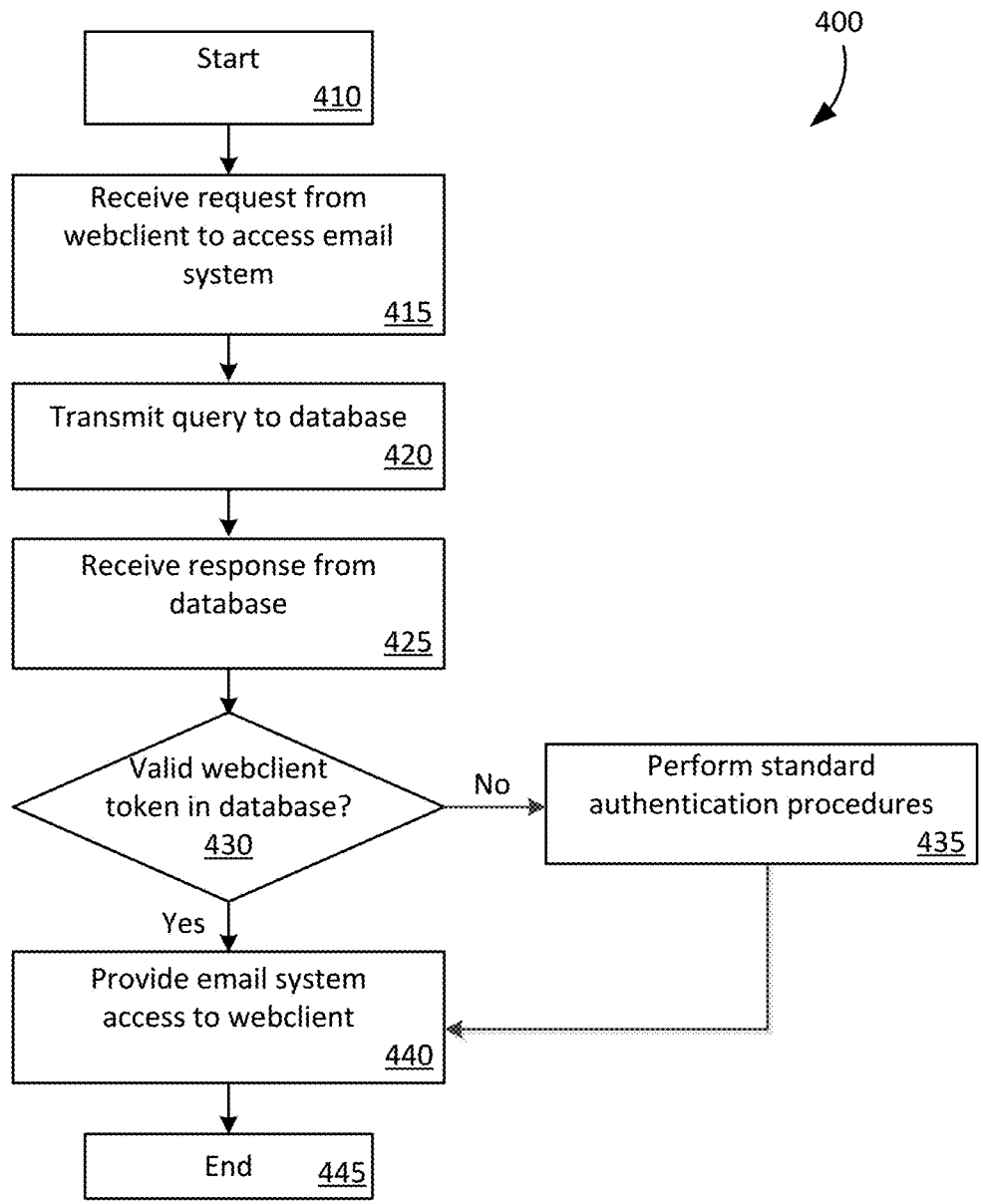
FIG. 4 depicts example operating procedures for an HTTP server, according to embodiments.

Note, however, that in some embodiments, the HTTP server that originally provided service to the webclient may fail, or connectivity between the HTTP server and webclient may fail for some reason, after establishing a communications session, authenticating the webclient, and storing a token or other authentication data in a database. In such embodiments, a backup or redundant HTTP server may then take over HTTP server functions for the webclient. FIG. 4 depicts example operating procedures 400 for an HTTP server according to such an embodiment. Operating procedures 400 begin with operation 410 and move to operation 415 where a backup HTTP server may receive a request for access to an email system from a webclient. At operation 420, the HTTP server may transmit a request to a database to determine whether a token or other authentication information for the webclient, a device executing the webclient, or a user of the webclient is present in the database. This operation may include constructing and transmitting a database query to a database. Such a query may include identifying information associated with the webclient, the device executing the webclient, or the user operating the webclient that can be used to look up a record in the database or determine that no such record exists. Such identifying information may take the form of a session identifier that identifies the webclient and/or the particular communication session previously underway between the webclient and its former HTTP server.

At operation 425, a response may be received from the database including a token or other authentication information for the webclient, a device executing the webclient, or a user of the webclient is present in the database. At operation 430, the HTTP server may determine whether the response received at operation 425 includes a valid token or other authentication information for the webclient, a device executing the webclient, or a user of the webclient is present in the database. This may be done by the HTTP server sending the token to a mail server and/or an authentication server for such a server to determine toke validity. A response may be received from such a server at the HTTP server indicating the validity of the token. If the token is not valid, at operation 435, the HTTP server may begin standard authentication procedures, such as those described in regard to FIG. 3. The HTTP server may also remove the invalid token from the database. If there is valid authentication information in the database, at operation 440, the HTTP server may provide email system access to the webclient, with operating procedures 400 ending at operation 445.

Note that in some embodiments, an HTTP server may interact directly with an authentication server, and may provide a token or other indication of successful authentication to a mail server as well as storing the token or other authentication information in a database. Alternatively, the mail server may store the token or other authentication information in a database. In another embodiment, the authentication server may store the token or other authentication information in a database. In such embodiments, any information needed to perform these functions may be exchanged amongst the devices. For example, where a mail server or an authentication server stores a token or other authentication information at a database, the mail server or authentication server may receive identifying information for a webclient, a device executing the webclient, or a user of the webclient is present in the database from the HTTP server so that such identifying information can be used to identify the record in which the token or other authentication information is stored. All such embodiments are contemplated as within the scope of the present disclosure.

Note that, as mentioned above, the embodiments set forth herein are not limited to use with email service providers, but may also be used in any system where a user operating a webclient may be authenticated and a connection to an HTTP server may be disrupted during the composition process. For example, many social media websites and other websites that restrict public access may require users to authenticate themselves before obtaining full access to the website. One skilled in the art will appreciate that the disclosed embodiments can be readily applied to such systems, and all such applications are contemplated as embodiments that are within the scope of the present disclosure.

Figure 5:
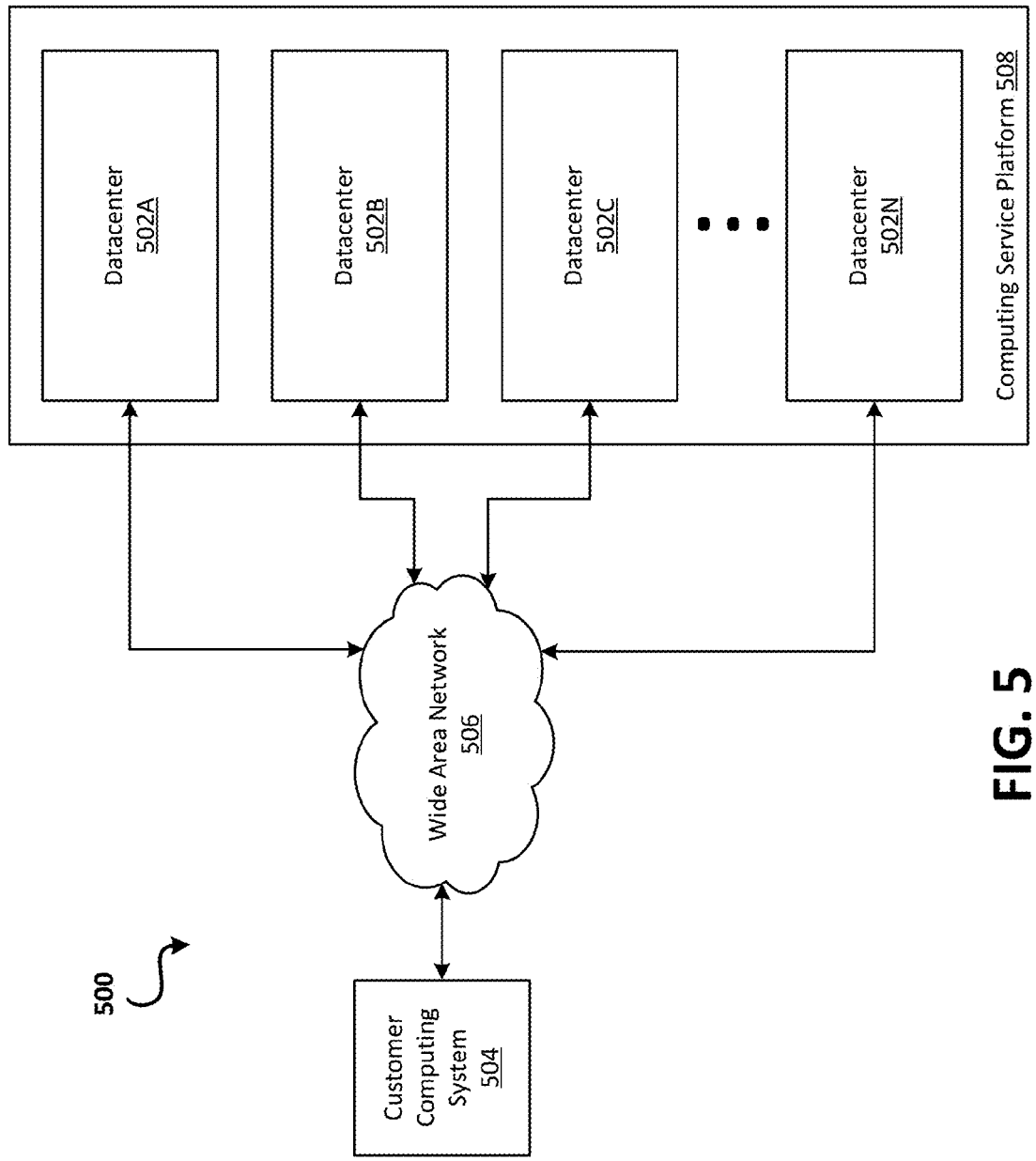
FIG. 5 depicts an example of a suitable computing environment in which embodiments described herein may be implemented.
Figure 6:
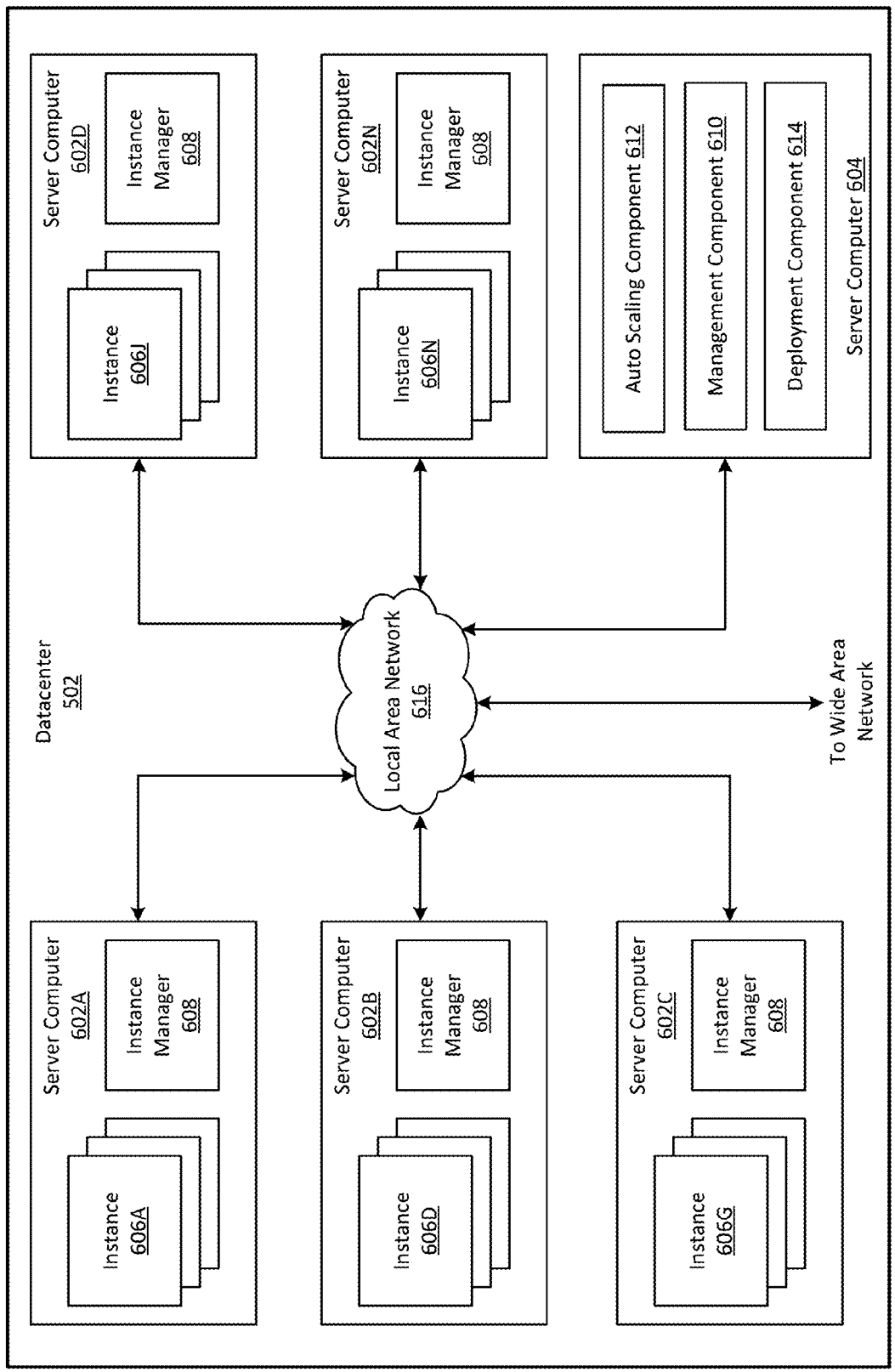
FIG. 6 depicts a computing system diagram that illustrates one configuration for a datacenter that implements computing services platform.
Figure 7:
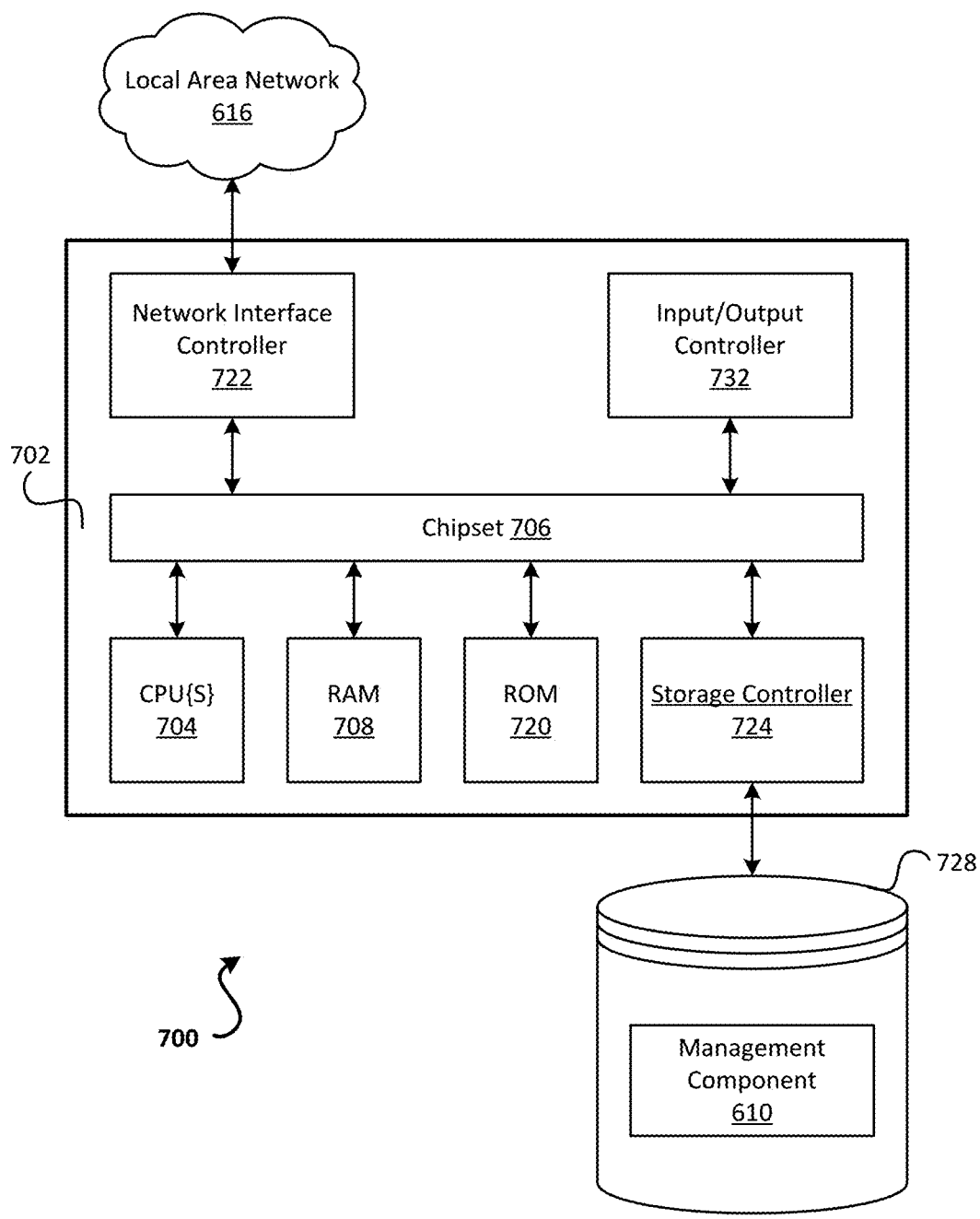
FIG. 7 depicts an example computer architecture for a computer capable of executing the above-described software components.

FIGS. 5-7 are similar to FIGS. 1 and 2 in that they depict example operating environments in which embodiments disclosed herein may be implemented, and these figures depict these operating environments at varying levels of granularity. FIG. 5 generally depicts a programmable execution service platform that comprises a plurality of datacenters. FIG. 6 generally depicts a datacenter that comprises a plurality of computers. FIG. 7 generally depicts a computer.

It may be appreciated that these operating environments of FIGS. 5-7 may be used to implement aspects of the operating environments of FIGS. 1 and 2. For example, HTTP servers 130 and 140, mail server 150, database 160, mail server 150, and authentication server 155 may be implemented in a datacenter 502 of FIG. 5, or across multiple datacenters 502 of FIG. 5. Likewise, Internet 120 of FIGS. 1 and 2 may be wide area network of FIG. 5, and user device 101 may be customer computing system 504 of FIG. 5.

Within a datacenter 502 of FIG. 5, HTTP servers 130 and 140, mail server 150, database 160, mail server 150, and authentication server 155 may each be a server computer 602 or 604 of FIG. 6 (which itself may be computer 700 of FIG. 7). Communications links 112, 123, 124, 153, 154, 163 164, and 157 of FIGS. 1 and 2 may be portions of local area network 616 of FIG. 6.

Turning now to details of FIG. 5, FIG. 5 depicts an example of a suitable computing environment in which embodiments described herein may be implemented. A cloud service provider (such as computing service platform 508) may configure the illustrated computing environment to host virtual clouds of entities and to enable communication paths between these virtual clouds that may otherwise be isolated. In particular, FIG. 5 is a system and network diagram that shows an illustrative operating environment 500 that includes a computing service platform 508 for implementing virtual clouds and for providing on-demand access to computing resources, such as virtual machine instances. Computing service platform 508 can provide computing resources for executing applications on a permanent or an as-needed basis and may be configured as a private network. These computing resources may include various types of resources, such as data processing resources, data storage resources, data communication resources and the like. Each type of computing resource may be general-purpose or may be available in a number of specific configurations. For example, data processing resources may be available as virtual machine instances. The instances may be configured to execute applications, including mail servers, web servers, HTTP servers, storage servers, application servers, media servers, database servers, and the like. Data storage resources may include file storage devices, block storage devices and the like.

Each type or configuration of computing resource may be available in different sizes, such as large resources consisting of many processors, large amounts of memory and/or large storage capacity and small resources consisting of fewer processors, smaller amounts of memory and/or smaller storage capacity. Entities may choose to allocate a number of small processing resources as web servers, HTTP servers, and/or one large processing resource as a database server, for example.

The computing resources provided by computing service platform 508 may be enabled by one or more datacenters 502A-502N, which may be referred herein singularly as "datacenter 502" or in the plural as "datacenters 502." Datacenters 502 may be facilities that house and operate computer systems and associated components and may include redundant and backup power, communications, cooling and security systems. Datacenters 502 may be located in a same geographical area, such as in a same facility, and may be interconnected using private networks, such as high-speed fiber optic networks, controlled and managed by a service provider of computing service platform 508. Datacenters 502 may also be distributed across geographically disparate locations and may be interconnected in part using public networks, such as the Internet. One illustrative configuration for datacenter 502 that implements the concepts and technologies disclosed herein is described below with regard to FIG. 6.

Entities of computing service platform 508 may access the computing resources provided by datacenters 502 over a wide-area network ("WAN") 506. Although a WAN is illustrated in FIG. 5, it should be appreciated that a local-area network ("LAN"), the Internet or any other networking topology known in the art that connects datacenters 502 to remote entities and other users may be utilized. It should also be appreciated that combinations of such networks may also be utilized.

One or more entities that are customers of computing service platform 508 may utilize a customer computing system 504 to access the computing resources provided by datacenters 502. Customer computing system 504 comprise a computer capable of accessing computing service platform 508, such as a server computer, a desktop or laptop personal computer, a tablet computer, a wireless telephone, a PDA, an e-reader, a game console, a set-top box or any other computing device.

As is described in greater detail below, customer computing system 504 may be utilized to configure aspects of the computing resources provided by computing service platform 508. In this regard, computing service platform 508 may provide a web interface through which aspects of its operation may be configured through the use of a web browser application program executing on customer computing system 504. Alternatively, a stand-alone application program executing on customer computing system 504 may access an application programming interface (API) exposed by computing service platform 508 for performing the configuration operations. Other mechanisms for configuring the operation of computing service platform 508, including launching new virtual machine instances on computing service platform 508, may also be utilized.

According to embodiments disclosed herein, capacities of purchased computing resources provided by computing service platform 508 may be scaled in response to demand. In this regard, scaling refers to the process of instantiating, which may also be referred to herein as "launching" or "creating," or terminating, which may also be referred to herein as "de-scaling," instances of computing resources in response to demand.

Auto scaling may be one mechanism for scaling computing resources in response to increases or lulls in demand for the resources. Auto scaling may allow entities of computing service platform 508 to scale their purchased computing resources according to conditions defined by the entity. For instance, rules may be defined for scaling up capacity in a particular manner in response to the occurrence of specified conditions, such as a spike in demand. Similarly, rules may also be defined to scale down capacity in a particular manner in response to the occurrence of other conditions, such as a lull in demand. The mechanisms disclosed herein for launching virtual machine instances may be utilized when instances are manually launched by an entity or when instances are launched by an auto scaling component in computing service platform 508.

Computing service platform 508 may also be configured with a deployment component to assist entities in the deployment of new instances of computing resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared and other types of information. The deployment component utilizes the entity-provided configuration and cache warming logic to launch, configure and prime new instances of computing resources.

FIG. 6 depicts a computing system diagram that illustrates one configuration for datacenter 502 that implements computing service platform 508. The example datacenter 502 shown in FIG. 6 may include several server computers 602A-602N, which may be referred herein singularly as "server computer 602" or in the plural as "server computers 602," for providing computing resources for hosting virtual clouds and for executing applications. Server computers 602 may be standard tower or rack-mount server computers configured appropriately for providing the computing resources described above. For instance, in one implementation server computers 602 may be configured to provide instances 606A-606N of computing resources.

Instances 606A-606N, which may be referred herein singularly as "instance 606" or in the plural as "instances 606," may be virtual machine instances. As known in the art, a virtual machine instance is an instance of a software implementation of a machine (i.e., a computer) that executes programs like a physical machine. In the example of virtual machine instances, each server computer 602 may be configured to execute an instance manager 608 capable of executing the instances. Instance manager 608 may be a hypervisor or another type of program configured to enable the execution of multiple instances 606 on a single server computer 602, for example. Each of instances 606 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources and with other types of resources. The embodiments disclosed herein may also execute all or a portion of an application directly on a computer system without utilizing virtual machine instances.

Datacenter 502 shown in FIG. 6 may also include a server computer 604 reserved for executing software components for managing the operation of datacenter 502, server computers 602 and instances 606. In particular, server computer 604 may execute a management component 610. As discussed above, an entity of computing service platform 508 may utilize customer computing system 504 to access management component 610 to configure various aspects of the operation of computing service platform 508 and instances 606 purchased by the entity. For example, the entity may purchase instances and make changes to the configuration of the instances. The entity may also specify settings regarding how the purchased instances are to be scaled in response to demand. The entity may also provide requests to launch instances to management component 610.

As also described briefly above, an auto scaling component 612 may scale instances 606 based upon rules defined by an entity of computing service platform 508. For example, auto scaling component 612 may allow an entity to specify scale up rules for use in determining when new instances should be instantiated and scale down rules for use in determining when existing instances should be terminated.

Auto scaling component 612 may execute on a single server computer 604 or in parallel across multiple server computers 602 in computing service platform 508. In addition, auto scaling component 612 may consist of a number of subcomponents executing on different server computers 602 or other computing devices in computing service platform 508. Auto scaling component 612 may be implemented as software, hardware or any combination of the two. Auto scaling component 612 may monitor available computing resources in computing service platform 508 over an internal management network, for example.

As discussed briefly above, datacenter 502 may also be configured with a deployment component 614 to assist entities in the deployment of new instances 606 of computing resources. Deployment component 614 may receive a configuration from an entity that includes data describing how new instances 606 should be configured. For example, the configuration may specify one or more applications that should be installed in new instances 606, provide scripts and/or other types of code to be executed for configuring new instances 606, provide cache warming logic specifying how an application cache should be prepared and other types of information.

Deployment component 614 may utilize the entity-provided configuration and cache warming logic to configure, prime and launch new instances 606. The configuration, cache warming logic, and other information may be specified by an entity using management component 610 or by providing this information directly to deployment component 614. Other mechanisms may also be utilized to configure the operation of deployment component 614.

In the example datacenter 502 shown in FIG. 6, an appropriate LAN 616 may be utilized to interconnect server computers 602A-602N and server computer 604. LAN 616 may also be connected to WAN 506 illustrated in FIG. 5. It should be appreciated that the network topology illustrated in FIGS. 5 and 6 has been greatly simplified and that many more networks and networking devices may be utilized to interconnect the various computing systems disclosed herein. Appropriate load balancing devices or software modules may also be utilized for balancing a load between each of datacenters 502A-502N, between each of server computers 602A-602N in each datacenter 502 and between instances 606 purchased by each entity of computing service platform 508. These network topologies and devices should be apparent to those skilled in the art.

It should be appreciated that datacenter 502 described in FIG. 6 is merely illustrative and that other implementations may be utilized. In particular, functionality described herein as being performed by management component 610, auto scaling component 612 and deployment component 614 may be performed by one another, may be performed by other components or may be performed by a combination of these or other components. Additionally, it should be appreciated that this functionality may be implemented in software, hardware or a combination of software and hardware. Other implementations should be apparent to those skilled in the art.

FIG. 7 depicts an example computer architecture for a computer 700 capable of executing the above-described software components. The computer architecture shown in FIG. 7 illustrates a conventional server computer, workstation, desktop computer, laptop, tablet, network appliance, PDA, e-reader, digital cellular phone or other computing device, and may be utilized to execute any aspects of the software components presented herein described as executing on user device 101, HTTP servers 130 and 140, mail server 150, database 160, mail server 150, and authentication server 155, within datacenters 502A-502N, on server computers 602A-602N, on the customer computing system 504 or on any other computing system mentioned herein.

Computer 700 may include a baseboard, or "motherboard," which is a printed circuit board to which a multitude of components or devices may be connected by way of a system bus or other electrical communication paths. One or more central processing units ("CPUs") 704 may operate in conjunction with a chipset 706. CPUs 704 may be standard programmable processors that perform arithmetic and logical operations necessary for the operation of computer 700.

CPUs 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

Chipset 706 may provide an interface between CPUs 704 and the remainder of the components and devices on the baseboard. Chipset 706 may provide an interface to a random access memory ("RAM") 708 used as the main memory in computer 700. Chipset 706 may further provide an interface to a computer-readable storage medium such as a read-only memory ("ROM") 720 or non-volatile RAM ("NVRAM") for storing basic routines that may help to start up computer 700 and to transfer information between the various components and devices. ROM 720 or NVRAM may also store other software components necessary for the operation of computer 700 in accordance with the embodiments described herein.

Computer 700 may operate in a networked environment using logical connections to remote computing devices and computer systems through network 616. Chipset 706 may include functionality for providing network connectivity through a network interface controller ("NIC") 722, such as a gigabit Ethernet adapter. NIC 722 may be capable of connecting the computer 700 to other computing devices over network 616. It should be appreciated that multiple NICs 722 may be present in computer 700, connecting the computer to other types of networks and remote computer systems.

Computer 700 may be connected to a mass storage device 728 that provides non-volatile storage for the computer. Mass storage device 728 may store system programs, application programs, other program modules and data, including message attachments and webclient state data, which have been described in greater detail herein. Mass storage device 728 may be connected to computer 700 through a storage controller 724 connected to chipset 706. Mass storage device 728 may consist of one or more physical storage units. Storage controller 724 may interface with the physical storage units through a serial attached Small Computer System Interface ("SCSI") ("SAS") interface, a serial advanced technology attachment ("SATA") interface, a fiber channel ("FC") interface or other type of interface for physically connecting and transferring data between computers and physical storage units.

Computer 700 may store data on mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units, whether mass storage device 728 is characterized as primary or secondary storage and the like.

For example, computer 700 may store information to mass storage device 728 by issuing instructions through storage controller 724 to alter the magnetic characteristics of a particular location within a magnetic disk drive unit, the reflective or refractive characteristics of a particular location in an optical storage unit or the electrical characteristics of a particular capacitor, transistor or other discrete component in a solid-state storage unit. Other transformations of physical media are possible without departing from the scope and spirit of the present description, with the foregoing examples provided only to facilitate this description. Computer 700 may further read information from mass storage device 728 by detecting the physical states or characteristics of one or more particular locations within the physical storage units.

In addition to mass storage device 728 described above, computer 700 may have access to other computer-readable storage media to store and retrieve information, such as program modules, data structures or other data. It will be appreciated by those skilled in the art that computer-readable storage media can be any available media that provides for the storage of non-transitory data and that may be accessed by computer 700.

By way of example and not limitation, computer-readable storage media may include volatile and non-volatile, transitory and non-transitory, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices or any other medium that can be used to store the desired information in a non-transitory fashion.

Mass storage device 728 may store an operating system utilized to control the operation of the computer 700. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 728 may store other system or application programs and data utilized by computer 700, such as management component 610 and/or the other software components described above.

Mass storage device 728 or other computer-readable storage media may also be encoded with computer-executable instructions, which, when loaded into computer 700, transforms the computer from a general-purpose computing system into a special-purpose computer capable of implementing the embodiments described herein. These computer-executable instructions transform computer 700 by specifying how CPUs 704 transition between states, as described above. Computer 700 may have access to computer-readable storage media storing computer-executable instructions, which, when executed by computer 700, may perform operating procedures such as those depicted in FIGS. 3 and 4.

Computer 700 may also include an input/output controller 732 for receiving and processing input from a number of input devices, such as a keyboard, a mouse, a touchpad, a touch screen, an electronic stylus or other type of input device. Similarly, input/output controller 732 may provide output to a display, such as a computer monitor, a flat-panel display, a digital projector, a printer, a plotter or other type of output device. It will be appreciated that computer 700 may not include all of the components shown in FIG. 7, may include other components that are not explicitly shown in FIG. 7 or may utilize an architecture completely different than that shown in FIG. 7.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein may be implemented in software, in hardware, or in a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks, operations, and states may be performed in an order other than that specifically disclosed, or multiple blocks or states may be combined in a single block or state. The example blocks, operations, and states may be performed in serial, in parallel or in some other manner. Blocks, operations, and states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing device for interacting with an email system, comprising:
   one or more computing resources configured at least to:
      receive a request to access an existing email communication session from a webclient;
      retrieve a token associated with the webclient from a data store;
      provide the token to the email system and receiving a response from the email system indicating that the token is valid; and
      responsive to receiving the indication that the token is valid, establish communication related to the existing email communication session with the webclient.

2. The computing device as recited in claim 1, wherein the token was stored by a different computing device that initiated the email communication session.

3. The computing device as recited in claim 1 wherein the one or more computing resources are further configured at least to receive authentication information from the webclient and provide the authentication information to an authentication server.

4. The computing device as recited in claim 1 wherein the one or more computing resources are further configured at least to transmit, upon authentication of the authentication information, a session identifier to webclient.

5. The computing device as recited in claim 1 wherein the one or more computing resources are further configured at least to retrieve a token associated with the webclient from a data store by locating a record associated with the webclient containing the token.

6. The computing device as recited in claim 1 wherein the one or more computing resources are further configured at least to retrieve a token associated with the webclient from a data store by sending a query to a database containing the token.

7. The computing device as recited in claim 1 wherein the one or more computing resources are further configured at least to execute a web application that facilitates communication between the webclient and a mail server.

8. A system for interacting with a messaging application, comprising:
   a messaging computing resource hosting the messaging application;
   a data store having stored therein a plurality of tokens associated with a plurality of webclients; and
   a server in network communication with the messaging computing node and the data store, the server comprising a processor in communication with a memory, the memory having stored therein computer readable instruction that at least:
      process a received request from a user computing device operating a webclient to access an existing messaging communication session between the webclient and the messaging application, wherein the existing messaging communication session was routed through another server;
      retrieve a token associated with the webclient from among the plurality of tokens stored in the data store based at least in part on information indicative of the webclient;

provide the token to the messaging system hosted on the messaging computing node and receiving a response from the messaging system indicating that the token is valid; and responsive to receiving the indication that the token is valid, establish communication related to the existing messaging communication session with the webclient.

9. The system as recited in claim 8, wherein the token was stored by a different computing device that initiated the messaging communication session.

10. The system as recited in claim 8, wherein the memory having stored therein computer readable instruction that at least receive authentication information from the webclient and provide the authentication information to an authentication server.

11. The system as recited in claim 8, wherein the memory having stored therein computer readable instruction that at least transmits, upon authentication of the authentication information, a session identifier to webclient.

12. The system as recited in claim 8, wherein the memory having stored therein computer readable instruction that at least retrieve a token associated with the webclient from a data store by locating a record associated with the webclient containing the token.

13. The system as recited in claim 8, wherein the memory having stored therein computer readable instruction that at least retrieve a token associated with the webclient from a data store by sending a query to a database containing the token.

14. The system as recited in claim 8, wherein the memory having stored therein computer readable instruction that at least execute a web application that facilitates communication between the webclient and a messaging server.

15. The computing device as recited in claim 8, further comprising retrieving a token associated with the webclient from a data store by locating a record associated with the webclient containing the token.

16. The computing device as recited in claim 8, further comprising executing a web application that facilitates communication between the webclient and a messaging server.

17. A method for interacting with a messaging system, comprising:

processing a received request to access an existing messaging session from a webclient;

retrieving a token associated with the webclient from a data store;

providing the token to the messaging system and receiving a response from the messaging system indicating that the token is valid; and responsive to receiving the indication that the token is valid, establishing communication related to the existing messaging communication with the webclient.

18. The method as recited in claim 17, wherein the token was stored by a different computing device that initiated the messaging communication session.

19. The method as recited in claim 17, further comprising receiving authentication information from the webclient and providing the authentication information to an authentication server.

20. The method as recited in claim 17, further comprising transmitting, upon authentication of the authentication information, a session identifier to webclient.

* * * * *